Oct. 14, 1924.
W. E. BURGIN
1,511,942
AUTOMOBILE WHEEL ALIGNING DEVICE
Filed Dec. 23, 1922
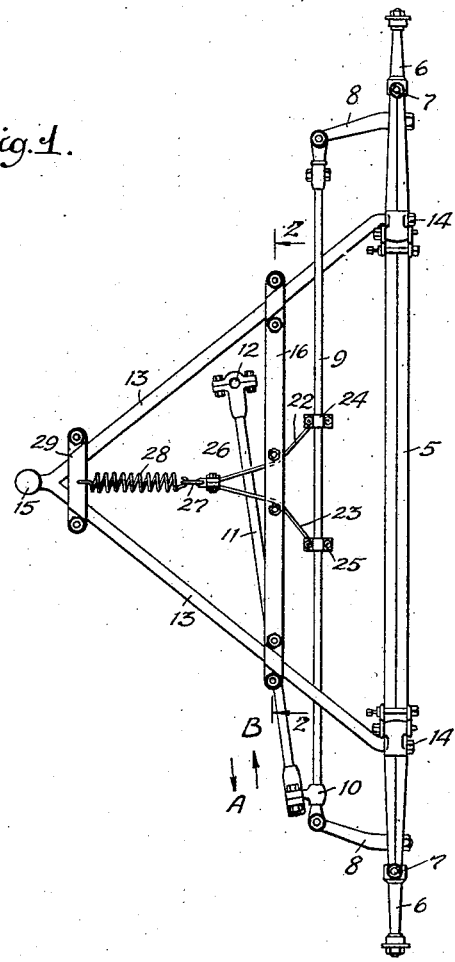
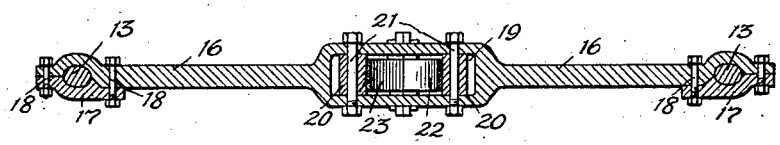
INVENTOR
W. E. BURGIN
BY
ATTORNEYS Patented Oct. 14, 1924.

1,511,942

UNITED STATES PATENT OFFICE.

WELBY E. BURGIN, OF CAMPBELLSVILLE, KENTUCKY.

AUTOMOBILE WHEEL-ALIGNING DEVICE.

Application filed December 23, 1922. Serial No. 608,709.

*To all whom it may concern:*

Be it known that I, WELBY E. BURGIN, a citizen of the United States, and a resident of Campbellsville, in the county of Taylor and State of Kentucky, have invented a new and Improved Automobile Wheel-Aligning Device, of which the following is a full, clear, and exact description.

The present invention relates to attachments for motor vehicles, and it pertains more particularly to means for aligning the steering wheels of motor vehicles.

It is one of the objects of the invention to provide means whereby the steering wheels of a motor vehicle will be normally maintained in alinement regardless of irregularities with which they come in contact while traveling over the road.

It is a further object of the invention to provide a device of this character which will automatically return the steering wheels to straight-ahead position upon the release of tension upon the steering gear of the steering wheel.

It is a further object of the invention to provide a device of this character which may be attached to the steering gear of wheels without necessitating a change in structure or parts of said gear.

With the above and other objects in view, reference is had to the accompanying drawings, in which—

Figure 1 is a top plan view of the front axle, front axle radius rod, and steering gear of a motor vehicle, the steering post and steering arm not being shown in this figure;

Fig. 2 is a horizontal sectional view taken on the line 2—2 in Fig. 1.

Referring more particularly to the drawings, the reference character 5 designates the front axle of a motor vehicle, and 6 designates the steering wheel spindles thereof, which steering wheel spindles are pivotally connected to the ends of the axle 5 by means of the steering knuckles 7. Each of these steering knuckles has a rearwardly disposed steering arm 8, and said steering arms 8 are connected by means of a tie-bar or the like, 9, pivotally connected at its ends to such steering knuckles. Connected to one end of the tie-bar 9, as at 10, is a drag link 11, and said drag link is connected, as at 12, to the steering wheel post (not shown.)

The reference character 13 designates the front axle radius rod, which in this type of motor vehicle, is substantially V-shaped, having its legs connected at their ends, as at 14, to the front axle 5. The rear end of this front axle radius rod is provided with a ball or the like, 15, by means of which it is connected to the motor crank case or other part of the chassis.

Spanning the legs of the front radius rod, is a bar 16, and such bar is provided on its ends with a removable clip portion 17 secured by means of bolts 18 to form a clamp about the legs of the front axle radius rod 13. As more clearly shown in Fig. 2, this bar 16 is provided intermediate its ends, with a housing portion 19, and mounted in said housing portion are rollers 20, said rollers being carried by bolts 21 passing through the side walls of the housing. It will be noted that these rollers are spaced with relation to each other, and passing through the space between the rollers are flexible members 22 and 23.

The flexible member 22 is connected at one end, by means of a clip 24, to the tie-bar 9, and the flexible member 23 is connected at one of its ends, by means of a clip 25, to the tie-bar 9. It will be noted that the distance between the clips 24 and 25 is greater than the distance between the rollers 20, thus causing the flexible members 22 and 23 to at all times contact with their respective rollers.

The opposite ends of the members 22 and 23 are connected by means of a clip 26, and said clip 26 has an eye 27 which engages one end of a spring 28. The other end of the spring 28 is connected to a cross bar 29 carried by the radius rod 13, as more clearly shown in Fig. 2.

By this construction it is apparent that if the drag link 11 is moved in the direction of the arrow A in Fig. 1, the flexible member 23 will be moved in the same direction by means of the tie-bar 9, and will thus place the spring 28 under tension. It is to be noted that the drag link 11 will be moved by the action of the hand wheel of the steering gear, and that immediately the pressure exerted thereon is released, under the influence of the spring 28 the flexible member will serve to return the steering wheels to normal alined position. If, however, the drag link is moved in the direction of the arrow B, in Fig. 1, the flexible member 22 will cause the spring 28 to be placed under tension, and immediately the wheel of the steering gear is released, the spring 28 will serve to return the steering wheels to normal position.

From the foregoing it is apparent that the present invention provides a novel means for maintaining the steering wheels of a motor vehicle in alinement at all times under normal condition. At the same time, the mechanism permits of operation of the steering gear to steer the vehicle. Furthermore, upon release of pressure or strain necessary to operate the steering gear, the wheels will be automatically returned to normal alined position.

What is claimed is:

In combination with a radius rod of the V-type and the steering gear of a motor vehicle, a bar connected to the legs of said radius rod, a plurality of spaced rollers carried by said bar, a spring connected at one end to the radius rod, diverging flexible elements secured to the other end of the spring, said diverging flexible elements passing between the rollers, and means for securing the free end of each of said diverging flexible elements to the tie-bar of the steering gear, the distance between the points of securement of said flexible elements being greater than the distance between the spaced rollers carried by the transverse bar.

WELBY E. BURGIN.